(No Model.)
C. E. SCRIBNER.
REGULATOR FOR DYNAMOS.
No. 552,397. Patented Dec. 31, 1895.
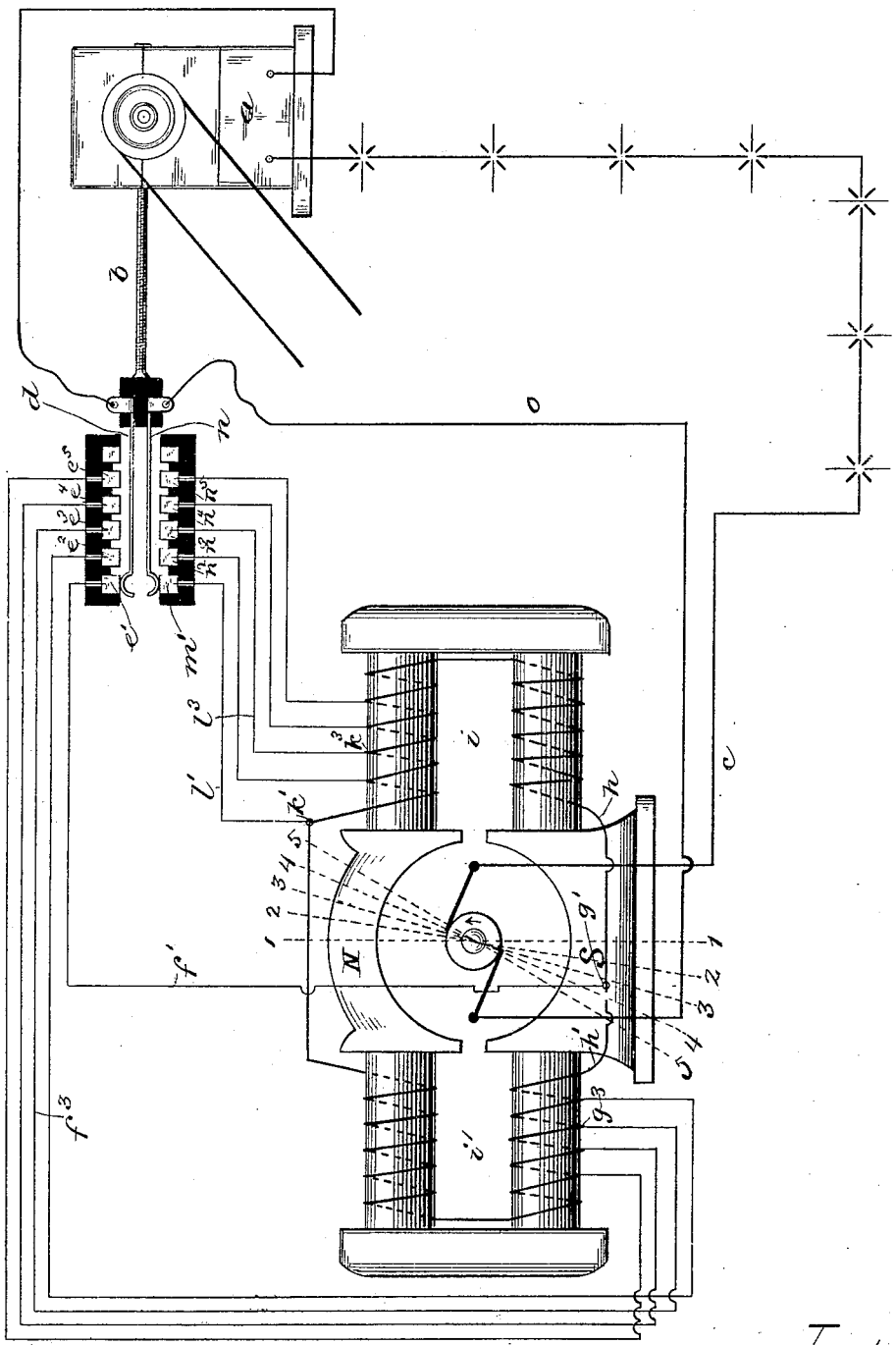
Witnesses.
C. G. Hawley.
Geo. R. Parker
Inventor.
Charles E. Scribner.
By George Barton
Attorney.

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

REGULATOR FOR DYNAMOS.

SPECIFICATION forming part of Letters Patent No. 552,397, dated December 31, 1895.

Application filed June 1, 1889. Serial No. 312,916. (No model.)

*To all whom it may concern:*

Be it known that I, CHARLES E. SCRIBNER, a citizen of the United States, residing at Chicago, in the county of Cook and State of Illinois, have invented a certain new and useful Improvement in Regulators for Dynamo-Electric Machines, (Case No. 177,) of which the following is a full, clear, concise, and exact description, reference being had to the accompanying drawing, forming a part of this specification.

In some forms of regulators for dynamo-electric machines an electromagnet is connected with the main circuit in such manner as to control a motor connected with the brushes to move the brushes backward or forward as the resistance of the circuit is increased or decreased.

My invention herein consists in the method of automatically rotating within certain limits the field of force itself, the brushes remaining always in the same position and all the parts of the machine itself remaining in constant relation—that is to say, the brushes, the armature, and the field magnets are unadjustable with respect to one another—yet by varying the direction of the current, or parts of the current, through the coils of the field-of-force magnets I am enabled to change the direction of the lines of force of the field with relation to the armature and brushes so as to maintain a practically constant current, notwithstanding variations in the work to be done—that is to say, in the current required by the translating devices—as, for example, arc lamps included in the circuit of the machine. This change in the direction of the lines of force I accomplish automatically by the action of the current itself. Thus the introduction of more resistance into the circuit operates mechanism which directs the current through the field in a direction or directions to move the lines of force in a direction to increase the voltage of the machine. Cutting out resistance, on the other hand, operates the same apparatus so as to rotate the lines of force in the other direction—that is, so as to decrease the voltage of the machine. In this manner the current-strength is maintained practically constant notwithstanding variations in the resistance of the circuit.

My invention is illustrated in the accompanying drawing, in which I have shown diagrammatically an arc-light circuit containing a dynamo-electric machine and a regulator embodying my invention.

The box $a$ should contain an electromagnet connected with the main circuit and adapted to control the direction of the movement of the rod $b$, the rod $b$ being drawn in toward the box when the current rises above the normal and being thrust out when the current falls below the normal or predetermined strength.

I have not deemed it necessary to describe the mechanism of the electromagnetic device and motor contained in the box $a$ in detail, since there are several forms of apparatus well known in the art whereby the rod $b$ may be reciprocated responsively to changes in the current-strength. Such a mechanism is illustrated and described in my application, Serial No. 194,369, filed March 8, 1886, for automatic regulators for dynamo-electric machines, (Case No. 102.)

I will consider the wire $c$ as connected with the positive terminal of the machine. The circuit may thus be traced from the machine by wire $c$ through the lamp-circuit and through the electromagnet in box $a$ and thence from contact $e'$ by wire $f'$ to point $g'$. At point $g'$ the circuit divides, extending in one direction by wire $h$ through the coils $i$ of the machine to point $k'$. In the other direction the circuit extends through wire $h'$ and coils $i'$ to said point $k'$. Thus the current is sent in multiple arc from point $g'$ to point $k'$ and thence by wire $l'$ to contact $m'$ and thence to the other spring-finger $n$ and thence by wire $o$ to the negative terminal of the machine. With the circuit thus connected in multiple arc between contacts $g'$ and $k'$ we will suppose the axis of polarity to be as indicated between 1 1 of the N and S poles of the field-magnet.

If the axis of polarity should be changed with respect to the armature, as indicated by dotted lines 2 2, 3 3, 4 4, and 5 5, the effect of the field upon the armature will be correspondingly decreased. Such a rotation of the pole, so to speak, about the armature is accomplished automatically by the connecting-rod $b$ drawing the spring-fingers $d\,n$ back so as to come successively between the contacts $e^2\,n^2\,e^3\,n^3\,e^4\,n^4\,e^5\,n^5$. Thus suppose lamps removed from the circuit so as to decrease the resistance thereof to produce the desired current; the axis of the pole with respect to the revolving armature and brushes in this case should be, as indicated by lines 3 3, between the N and S poles. The weakening of the current causes the regulator to draw rod $b$ inwardly so as to bring spring-fingers $d\,n$ between contacts $e^3\,n^3$. The circuit then would be traced from spring-finger $d$ through wire $f^3$ to point $g^3$ of coil $i'$, and thence the current would divide, passing in multiple arc from contact $g^3$ in one direction toward point $g'$ and thence over wire $h$ through the coils $i'$ as far as point $k^3$. In the other direction the current would pass from point $g^3$ through the coils $i$ past contact $k'$ to point $k^3$. Thus the current would be united at $k^3$ instead of at $k'$, as before described, and the circuit would be completed at contact $n^3$. Thus, responsively to changes in the resistance of the circuit, the spring-fingers $d\,n$ are brought between different contacts $n\,e$ and the axis of polarity is shifted accordingly to increase or decrease the current-strength.

It will be observed that the ampère turns of the field-magnets are always the same, the current, however, being directed through said coils in multiple. Considering, then, the cores, heel-irons, and pole-pieces as an iron ring, and the multiple winding as distributed thereon after the manner of the coils upon a Gramme ring, it will be evident that the lines of force may be rotated without varying the strength of mechanism of the ring. This is of great advantage since it is desirable, if not absolutely necessary, in certain machines to have the iron kept nearly to the point of magnetic saturation.

The brushes and the spring-fingers, as shown, are in position to give the maximum voltage. The brushes in their relation to the commutator of the machine may be in pairs or may be single brushes with diagonally-slotted commutators to give the desired degree of overlap. These two forms are well-known equivalents in the art.

I am aware that it has been proposed heretofore to provide upon the field-cores of a consequent pole-dynamo sectionally-wound coils, a greater or less number of which are adapted to be cut into or out of circuit, the sectionally-wound coils being provided in connection with a single one of the consequent poles whereby the magnetic field through that pole alone is adapted to be rotated, the field through the other pole being maintained substantially stationary, (Letters Patent No. 294,169, February 26, 1884,) but it has not been proposed heretofore to provide upon the cores symmetrically-disposed sectionally-wound coils whereby the entire magnetic field through the armature is adapted to be rotated.

My invention admits of various modifications which would readily suggest themselves to those skilled in the art. I therefore do not limit myself to the details of construction shown.

Having thus described my invention, I claim as new and desire to secure by Letters Patent—

1. In a dynamo electric machine provided with consequent pole pieces, the combination with symmetrically disposed sectionally wound field magnet coils, of means for altering the circuit connections of the sections of said coils to vary the relative magnetizing power of said coils, thereby rotating the entire field of force through the armature about the axis of the armature in a plane perpendicular to said axis; whereby the diameter of maximum commutation is shifted to vary the voltage of the machine, substantially as described.

2. In a dynamo electric machine, provided with consequent pole pieces, the combination with symmetrically disposed sectionally wound field magnet coils, the sections thereof terminating in contact pieces, of contact fingers moving over said contact pieces, and a regulating mechanism responding to change in the current strength of the working circuit, adapted to control said contact fingers; whereby the entire field of force through the armature is rotated about the axis of the armature and in a plane perpendicular thereto, substantially as described.

In witness whereof I hereunto subscribe my name this 9th day of May, A. D. 1889.

CHARLES E. SCRIBNER.

Witnesses:
  GEORGE P. BARTON,
  ELLA EDLER.